United States Patent
Suzuki

(10) Patent No.: US 6,744,563 B2
(45) Date of Patent: Jun. 1, 2004

(54) COLLIMATING LENS

(75) Inventor: Yoshimasa Suzuki, Kawasaki (JP)

(73) Assignee: Olympus Corporation, Shibuya-ku (JP)

( * ) Notice: Subject to any disclaimer, the term of this patent is extended or adjusted under 35 U.S.C. 154(b) by 0 days.

(21) Appl. No.: 10/456,739

(22) Filed: Jun. 9, 2003

(65) Prior Publication Data

US 2004/0051956 A1 Mar. 18, 2004

(30) Foreign Application Priority Data

Jun. 13, 2002 (JP) ........................................ 2002-172969

(51) Int. Cl.⁷ .............................................. G02B 27/30
(52) U.S. Cl. ...................................... 359/641; 359/708
(58) Field of Search ............................... 359/641, 708, 359/618, 619

(56) References Cited

U.S. PATENT DOCUMENTS 6,236,512 B1 * 5/2001 Nakai ........................ 359/641
6,324,013 B1 * 11/2001 Nakai ........................ 359/641

FOREIGN PATENT DOCUMENTS

JP 2002-055276 2/2002

* cited by examiner

Primary Examiner—Hung X. Dang
(74) Attorney, Agent, or Firm—Kenyon & Kenyon

(57) ABSTRACT

The present invention is a collimating lens, comprising
a lens having at least one aspherical surface, wherein the collimating lens is used in a wavelength range of 1.2 $\mu$m to 1.7 $\mu$m and satisfies the following conditions:

$226 \leq x \leq 456$ and $y \leq 1.8$, wherein where x is an infrared distribution indicator defined by $x = (n(1.55) - 1)/(n(1.45) - n(1.65))$, y is an index of refraction at a wavelength of 1.55 $\mu$m shown by $y = n(1.55)$, and n(a) is an index of refraction at wavelength of a.

5 Claims, 4 Drawing Sheets

FIG. 2 RELATIONSHIP BETWEEN INDEX OF REFRACTION y AND INFRARED DISTRIBUTION INDICATOR x

SPHERICAL ABERRATION

COLLIMATING LENS

BACKGROUND OF THE INVENTION

1. Field of the Invention

The present invention relates to a collimating lens. This application is based on Japanese Patent Application No. 2002-172969, the content of which is incorporated herein.

2. Description of Related Art

In recent years the internet has become progressively more widely used and the volume of communication data has progressively increased. Consequently, even greater increases in speed and volume are being sought in optical communication systems. As a result, signal multiplexing is being attempted. An example of this is the dense wavelength division multiplexing (DWDM) communication system. In DWDM signals are placed on 200 to 1000 types of wavelength enabling signal multiplexing to be performed. Because of this, DWDM is being studied as an optical communication system providing increased speed and volume.

Conventionally, in this type of optical communication system, a light source that is capable of outputting light in a plurality of wavelengths (such as a semiconductor laser) is used. A technology is also employed in which optical signals of the different wavelengths being output from the light source are combined in a transmission device such as an optical fiber using an optical element. For example, divergent light whose wavelength is strictly controlled is emitted from the light source. This divergent light is converted to parallel light beam by a collimating lens. Subsequently, this parallel light beam is introduced into an optical fiber combination lens, and is condensed onto the focal plane thereof. By placing an optical fiber on this focal plane, the light beam (optical signals) is combined.

At this time, a gradient index lens is used for the collimating lens and the optical fiber combination lens.

Furthermore, recently, the idea has been proposed of using an aspherical lens for the above lenses. The reason for this is to improve the combination efficiency of the light beam with the optical fiber, or of the light beam with the light source. For example, Japanese Patent Application No. 2002-55276 discloses an aspherical lens for use in an optical communication system. The purpose of the aspherical lens disclosed here is to reduce chromatic aberration and obtain a high level of efficiency. Aspherical lenses that may be used in place of gradient index lenses are also available commercially.

SUMMARY OF THE INVENTION

The collimating lens of the present invention comprises a lens having at least one aspherical surface, wherein the collimating lens is used in a wavelength range of 1.2 µm to 1.7 µm and satisfies the following conditions:

$$226 \leq x \leq 456$$

$$y \leq 1.8.$$

Where x is an infrared analysis indicator defined by x=(n(1.55)−1)/(n(1.45)−n(1.65)), y is an index of refraction at a wavelength of 1.55 µm shown by y=n(1.55), and n(a) is the index of refraction at wavelength of a.

It is preferable that said collimating lens satisfies the following condition:

$$0.6 \leq \alpha \leq 1.1,$$

wherein α is a sagital constant and defined by the formula $$\alpha = NA/(n(1.55)-1),$$

wherein NA is an numerical aperture of the collimating lens.

It is preferable that said collimating lens satisfies the following condition:

$$300 \leq x \leq 456.$$

It is preferable that said collimating lens satisfies the following condition:

$$1.75 \leq y\ 1.8$$

It is preferable that said collimating lens has an optical surface that has a reflectance of 1% or less in at least a portion of the wavelength range.

DETAILED DESCRIPTION OF THE INVENTION

Figure 1:
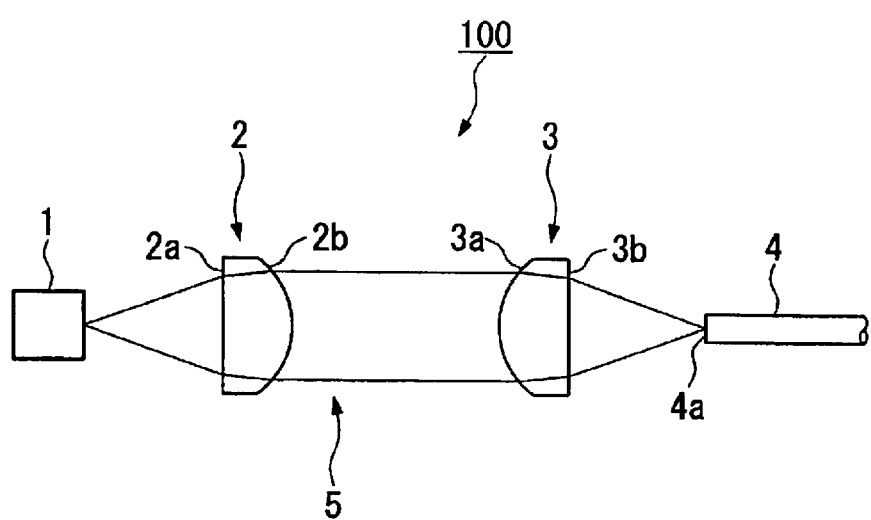
FIG. 1 is a cross-sectional schematic view in the optical axis direction when the collimating lens according to the present invention is applied in an optical signal entrance section of an optical communication system.

An embodiment of the present invention will now be described with reference made to the attached drawings. Note that the same reference marks are given to identical or corresponding members in each drawing. FIG. 1 is a cross-sectional schematic view in the optical axis direction when the collimating lens according to the present embodiment is applied in an optical signal entrance section of an optical communication system.

The optical signal entrance section 100 that uses the collimating lens 2 according to the present embodiment forms one portion of the apparatuses in an optical communication system or the like. The optical signal entrance section 100 is provided with a semiconductor laser 1, a collimating lens 2, an optical fiber combination lens 3, and an optical fiber 4 that are arranged in sequence. The reference mark 5 schematically indicates an outermost portion of light flux.

The semiconductor laser 1 has a variable wavelength in the wavelength range between 1.2 µm and 1.7 µm. The semiconductor laser 1 generates optical signals by modulating light whose wavelength is controlled to within an accuracy of 1 nm.

The collimating lens 2 is an optical element that changes divergent light beam irradiated from the semiconductor laser 1 into parallel light beam. Therefore, the semiconductor laser 1 and the collimating lens 2 are positioned such that the light emission point (not shown) of the semiconductor laser 1 matches the focal point of the collimating lens 2. The reference marks 2a and 2b respectively indicate entrance surface and exit surface of the collimating lens 2.

The collimating lens 2 is manufactured from a material (e.g. glass) having a uniform index of refraction. In addition, the collimating lens 2 is formed either by a single lens or by a combination of a plurality of lenses and has a positive power. The collimating lens 2 also has at least one aspheric optical surface. As a result, excellent aberration correction can be performed using a small number of optical surfaces. In order to achieve reductions in manufacturing costs and size, a single lens is particularly preferable. It is still more preferable if a plano-convex lens is used in which the entrance surface 2a is a flat surface perpendicular to the optical axis of the semiconductor laser 1, and the exit surface 2b is a convex aspherical surface.

The infrared distribution indicator x and the index of refraction y are defined using Formulas (1) and (2).

$$x=(n(1.55)-1)/(n(1.45)-n(1.65)) \quad (1)$$

$$y=n(1.55) \quad (2)$$

Here, n(a) is a function expressing the index of refraction of the material at the wavelength a ($\mu$m).

It is preferable that the collimating lens 2 satisfies Formulas (3) and (4) below.

$$226 \leq x \leq 456 \quad (3)$$

$$y \leq 1.8 \quad (4)$$

If the lower limit of the condition set for x is exceeded, then chromatic aberration cannot be satisfactorily corrected. If the upper limit of the condition set for x is exceeded, then it is difficult to obtain the material at low cost. If the upper limit of the condition set for y is exceeded, then the processing requires excessive labor.

An even more preferable range for x is shown in Formula (5) below.

$$300 \leq x < 456 \quad (5)$$

An even more preferable range for y is shown in Formula (6) below.

$$1.75 \leq y \leq 1.8 \quad (6)$$

If the conditions are set so as to satisfy both Formulas (5) and (6), then clearly this is still more preferable.

When the sagital constant a is defined using the numerical aperture NA as $\alpha=NA/(n(1.55)-1)$
(7)
then it is preferable that the collimating lens 2 satisfies Formula (8) bselow.

$$0.6 \leq \alpha \leq 1.1 \quad (8)$$

wherein $\alpha$ is the sagital constant.

Note that "sagital" means the depth of the lens, namely, the amount of sag.

Here, a brief explanation will be given as to the meaning of the sagital constant $\alpha$. "Sagital" refers to the depth of the lens, namely, the amount of sag. The sag of the lens is determined by the index of refraction of the lens and the numerical aperture NA. The product of the denominator in the above formula (n(1.55)–1) and the curvature is a quantity expressing the power at the refraction plane. Accordingly, in order to provide a predetermined power, it is necessary to increase the curvature as the value of (n(1.55)–1) decreases. This causes sag of the lens to decrease. Conversely, it is necessary to decrease the curvature as the value of (n(1.55)–1) increases. This causes sag of the lens to increase. It is also necessary to increase the lens diameter (i.e., the aperture diameter) as the numerical aperture NA increases. This causes the sag to increase. Accordingly, in the above formula, because the amount of the sag increases as the numerical aperture NA of the numerator increases or as the size of the denominator decreases, the sagital constant $\alpha$ is an indicator expressing the amount of the sag.

If the lower limit of the condition is exceeded, then it is difficult to obtain a sufficient NA for the collimating lens. As a result, it is not possible to efficiently condense light from the light source. If the upper limit of the condition is exceeded, then the processing of the lens becomes difficult.

The collimating lens 2 of the above described present embodiment can be manufactured by a glass molding process in which a material is heated, pressed in a lens mold, cooled, and then removed from the mold. If a single lens is not used, then a suitable plurality of lenses may be adhered together.

In order to perform the glass molding process with a high degree of precision, it is desirable that the lens thickness is as uniform as possible. This is to make it possible to reduce a sink made on molding face by cooling unevenness and the like. It is particularly desirable that the sag is reduced.

It is also desirable that a material with a low transition point (Tg) be used. If such a material is used the glass fluidity is high even at a comparatively low temperature. The advantage of this is that the durability of the lens mold can be improved.

It is preferable that an anti reflection coating is applied on the optical surfaces (i.e., the entrance surface 2a and the exit surface 2b) of the collimating lens 2. Particularly, it is preferable to apply a coating having a wavelength range such that the reflectance of the optical surfaces in the wavelength range of 1.2 $\mu$m to 1.7 $\mu$m is less than 1%. It is also preferable that the wavelength range of transmitted light, for example, the wavelength band for optical communication is included either in a portion of the above wavelength range or in the vicinity thereof. This type of anti reflection coating can be provided in an appropriate manner such as, for example, by forming a multilayer thin film by the alternate vapor deposition of thin films having different indexes of refraction.

Next, the optical fiber combination lens 3 (referred to hereinafter simply as the combination lens 3) is an optical element provided with a positive power in order to condense parallel light beam at a predetermined focal point. The combination lens 3 is formed either by a single lens or by combining a plurality of lenses formed from a low dispersion glass material. The optical combination lens 3 is positioned such that the optical axis thereof matches that of the collimating lens 2. Note that the reference marks 3a and 3b respectively indicate an entrance surface and an exit surface.

It is preferable that the same lens as is used for the collimating lens 2 is used for the combination lens 3. It is particularly preferable that the collimating lens 2 is positioned in the following manner and used as the combination lens 3. Namely, the collimating lens 2 should be positioned such that the exit surface 2b thereof forms the entrance surface 3a of the combination lens 3, and such that the entrance surface 2a thereof forms the exit surface 3b of the combination lens 3.

The optical fiber 4 may be formed, for example, by glass fiber. The optical fiber 4 is positioned such that an entrance aperture 4a substantially matches the focal point of the optical fiber combination lens 3. Namely, the optical fiber 4 is placed at a position such that light beam 5 condensed by the combination lens 3 is able to enter into the optical fiber 4.

Next, the function of the collimating lens 2 according to the present embodiment will be described.

Firstly, the collimating lens 2 is provided with an exit surface 2b, which is an aspherical surface. This allows aberration correction to be accurately performed using a small number of surfaces. Moreover, because the number of optical surfaces can be decreased a reduction in size and cost can be achieved. In particular, when the collimating lens is formed by a plano-convex lens the only machined surface of the lens is the exit surface 2b, which is a convex aspherical surface. Accordingly, this is the most effective. It is also effective if the entrance surface 2a thereof, which is the flat surface side, is used as the placing surface or clamp surface of the lens. The advantage of this is that assembly of the lens in an apparatus as well as adjustment and mounting are simplified.

Figure 2:
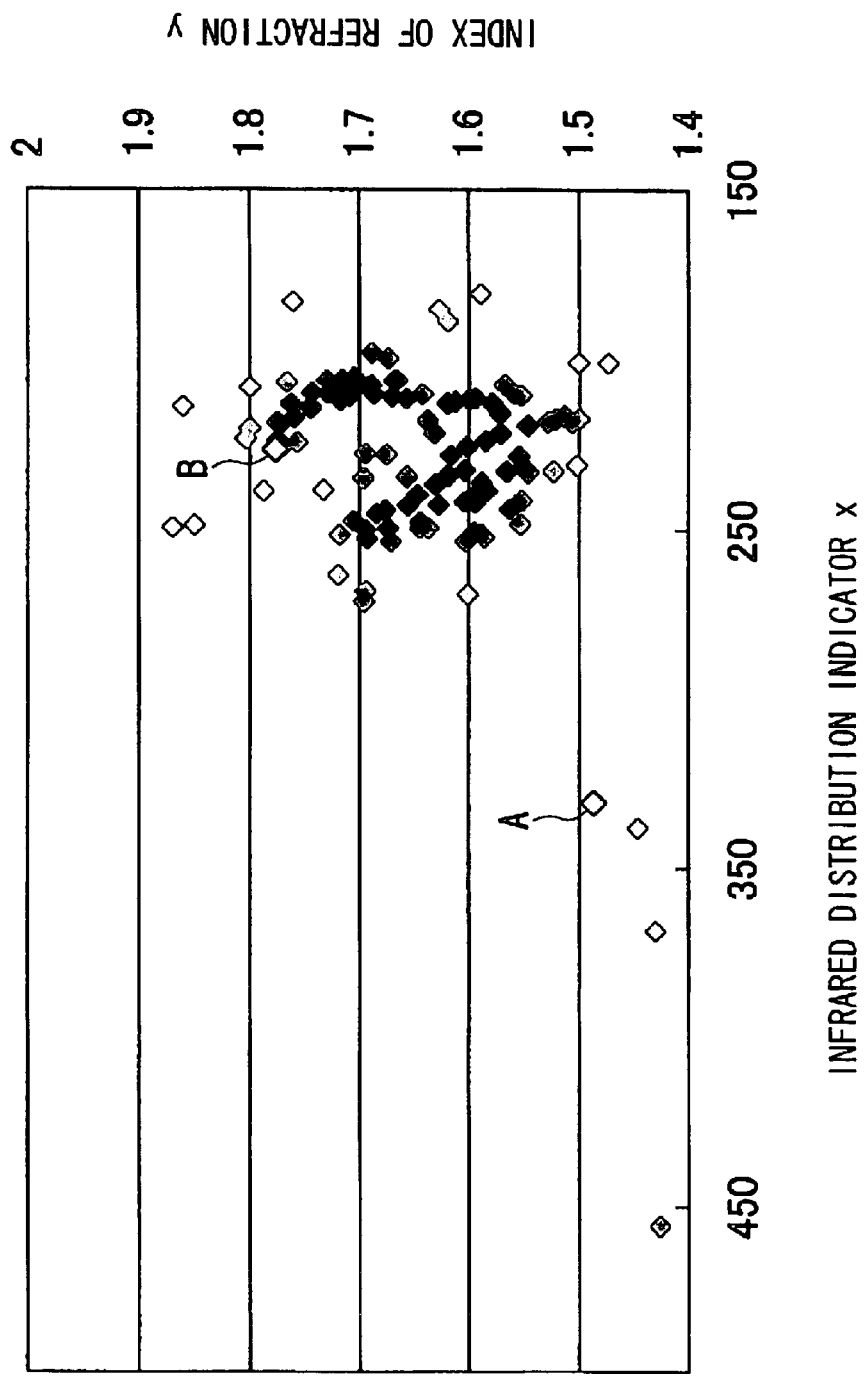
FIG. 2 is a graph showing a relationship between an index of refraction y and an infrared distribution indicator x in various types of materials.

Next, the selection of the material will be described. Firstly, the infrared distribution indicator x and the index of refraction y will be described while referring to FIG. 2. FIG. 2 is a graph showing the relationship between an index of refraction y and an infrared distribution indicator x in various types of materials. The horizontal axis is the infrared distribution indicator x while the vertical axis is the index of refraction y, each of which is non-denominated. The black dots show x and y determined from the data for materials currently available. The data shown by A and B refer to the numerical examples according to the present invention that are described later.

When designing a collimating lens for use in the infrared bands, the inventors of the invention of the present application used an infrared distribution indicator x and an index of refraction y in the 1.55 μm wavelength. And, by selecting the material based on the relationship between an infrared distribution indicator x showing distribution characteristics similar to Abbe's number in the infrared region and an index of refraction y at the 1.55 μm wavelength, they had the new idea of making a logical design in the infrared region.

In FIG. 2 the vertical axis shows the index of refraction y. The horizontal axis shows the infrared distribution indicator x. Accordingly, FIG. 2 shows the size of the distribution of the material in the infrared region. In FIG. 2, the distribution is lower as the value is higher.

Because the collimating lens 2 of the present embodiment is formed using a material having an infrared distribution indicator of 226 or more (Formula (3)), excellent low distribution characteristics are obtained, and chromatic aberration can be decreased. As a result, even if the wavelength used varies, the motion amount of the focal point of the collimating lens 2 can still be suppressed to a low level. Namely, defocused light beam 5 does not cause larger spot diameter than the entrance aperture 4a and consequently being shaded. Accordingly, deterioration of the signal intensity due to shading can be prevented.

The reason for keeping x at 456 or less (Formula (3)) is because material that exceeds this upper limit is difficult to obtain and is not good at economical point.

Furthermore, the collimating lens 2 according to the present invention is formed from material having an index of refraction y in the 1.55 μm wavelength of 1.8 or less (Formula (4)). Accordingly, there is no problems such as the optical path length changing significantly due to minor discrepancies in the shape of the optical surface, and thus leading to deterioration in the condensing performance. As a result, because there is no requirement for surface precision in excess of general processing capabilities, the processing is simplified. In addition, the lens characteristics of the completed collimating lens 2 are not significantly affected by shape discrepancies in the optical surfaces.

As described above, severe surface accuracy is required as the size of the index of refraction y increases. In contrast, the power of the material increases as the size of the index of refraction y increases. Because of this it is possible to increase the radius of curvature of the optical surface and decrease the sag. Therefore, in the present embodiment, the index of refraction y is preferably set at 1.75 or more (Formula (6)). By satisfying this condition, a collimating lens 2 that has favorable sag for glass molding can be provided.

The numerical aperture NA of the collimating lens 2 of the present embodiment is regulated by Formulas (7) and (8). Light beam emitted from the semiconductor laser 1 is light beam that diverges at a predetermined divergence angle. However, by satisfying these conditions substantially all the light beam can be condensed by the collimating lens 2. As a result, a collimating lens 2 can be provided in which there is no reduction in optical signal intensity caused by shading of the incident light beam.

Furthermore, an anti reflection coating having a reflectance of less than 1% in at least a portion of the wavelength range of 1.2 μm to 1.7 μm is provided on the collimating lens 2. As a result, optical loss caused by reflection at the optical surfaces is reduced, enabling any deterioration in the optical signal intensity to be suppressed.

Figure 3:
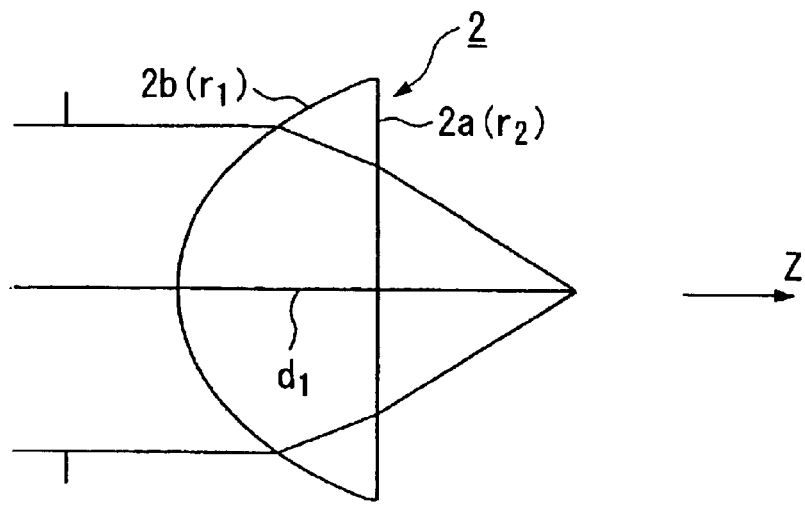
FIG. 3 is an optical path diagram of a first numerical example of the collimating lens according to an embodiment of the present invention.
Figure 4:
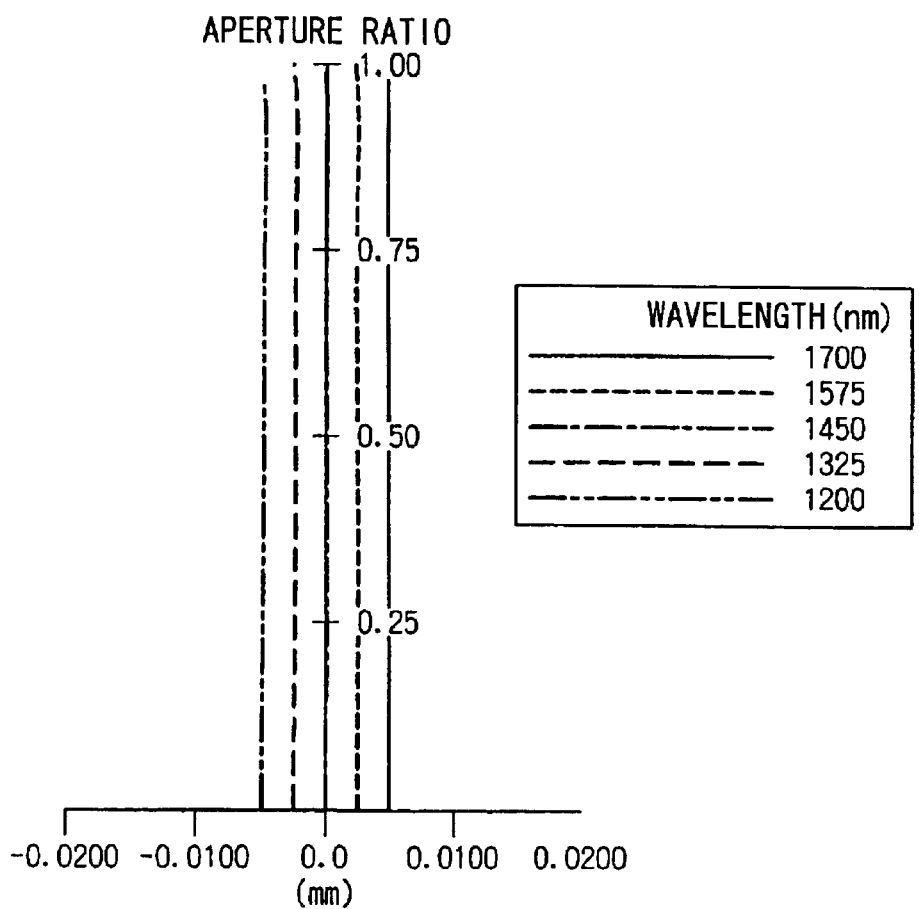
FIG. 4 is a diagram showing spherical aberration in the first numerical example of the same embodiment.
Figure 5:
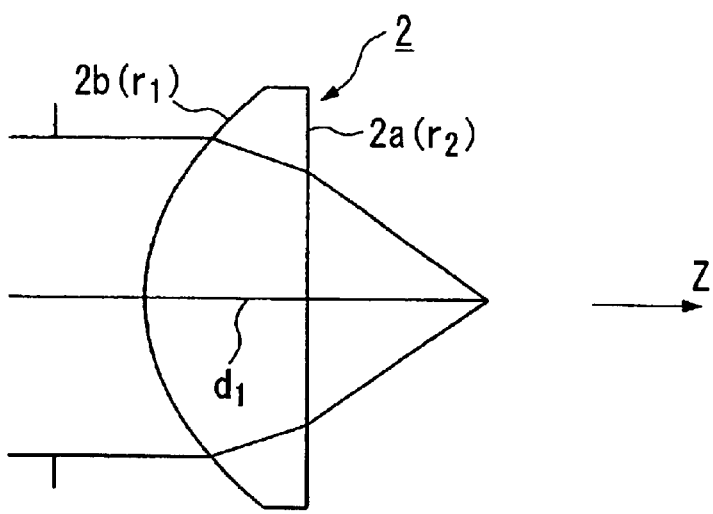
FIG. 5 is an optical path diagram of a second numerical example of the collimating lens according to an embodiment of the present invention.
Figure 6:
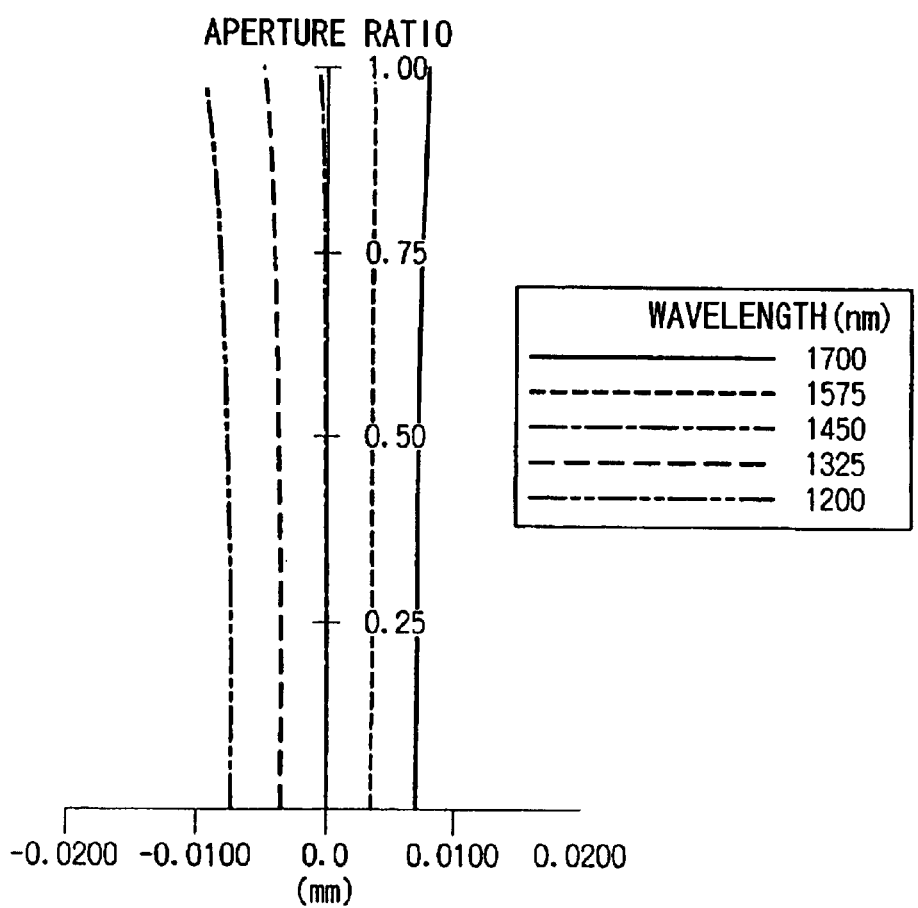
FIG. 6 is a diagram showing spherical aberration in the second numerical example of the same embodiment.

Next, specific numerical examples of the collimating lens 2 of the present embodiment will be described. FIG. 3 is an optical path diagram of a first numerical example of the collimating lens 2 according to the present embodiment. FIG. 4 is a diagram showing spherical aberration in the first numerical example of the same embodiment. FIG. 5 is an optical path diagram of a second numerical example of the collimating lens 2 according to the present embodiment. FIG. 6 is a diagram showing spherical aberration in the second numerical example of the same embodiment.

EXAMPLES

Example 1

A first numerical example of a specific lens design that can be used as the above described collimating lens 2 will now be described using FIGS. 3 and 4.

In this example the collimating lens 2 is formed by a plano-convex lens. As is shown in FIG. 3, the exit surface 2b is a convex surface having an aspherical surface (r1) and the entrance surface 2a is a flat surface (r2=∞). In this example, in the 1.2 μm to 1.7 μm wavelength range there are no differences in the optical path large enough to be evident in the drawings.

Specific structural parameters of this example are shown below.

The aspherical surface of r1 is a rotationally symmetric aspherical surface having the Z axis as the axis of symmetry shown by Formula (9).

$$Z = \frac{ch^2}{1 + \sqrt{1 - (1+k)c^2h^2}} + Ah^4 + Bh^6 \qquad (9)$$

wherein
z is the sag of the parallel plane relative to the Z axis,
c is the curvature (1/R) of the surface apex, and
k is the conic coefficient (the conic constant).
The structural parameters of the convex aspherical surface r1 are shown below.

| | |
|---|---|
| Radius of curvature: | R = 0.72920 (mm) |
| Conic constant: | k = −0.61500 |
| Aspheric fourth order coefficient A: | $0.274300 \times 10^{-1}$ |
| Aspheric sixth order coefficient B: | $0.170700 \times 10^{-1}$ |

Additional structural parameters are shown below.

| | |
|---|---|
| Lens thickness: | d1 = 0.9300 (mm) |
| Glass: | |
| index of refraction | nd = 1.49700 |
| Abbe's number | vd = 81.6 |
| Transition point | Tg = 460 |
| | (degrees at centigrade) |
| Index of refraction at 1550 nm wavelength: | y = 1.48597 |
| Operating distance between fiber and lens: | Wd = 0.894 (mm) |
| Effective focal distance (1550 nm wavelength): | f = 1.50 (mm) |
| Effective aperture diameter: | D = 1.5 (mm) |
| | (NA = 0.5) |

In the present example x=330.5, y=1.48597, and α=1.03. The material at the point indicated by the reference mark A in FIG. 2 is used in this example. As is shown in FIG. 4, in this example, aberration is restricted in the 1.2 μm to 1.7 μm wavelength range and is approximately 0.01 mm at maximum for focal points of each wavelength, showing that the present example exhibits an excellent image forming performance.

In the present example, because the index of refraction y is comparatively small the sag is comparatively large. However, because a material with a low transition point Tg of 460 degrees at centigrade was used, the mold ability is excellent, and because the optical distance is short the surface precision can be loosened enabling productivity to be improved.

Example 2

A second numerical example of a specific lens design that can be used as the above described collimating lens 2 will now be described using FIGS. 5 and 6.

The collimating lens 2 of this example is also formed by a plano-convex lens in the same way as in the Example 1. As is shown in FIG. 5, the exit surface 2b is a convex surface having an aspherical surface (r1) and the entrance surface 2a is a flat surface (r2=∞). In this example, in the 1.2 μm to 1.7 μm wavelength there are no differences in the optical path large enough to be evident in the drawings.

Specific structural parameters of this example are shown below.

The aspherical surface of r1 is a rotationally symmetric aspherical surface having the Z axis as the axis of symmetry shown by Formula (9).

The structural parameters of the convex aspherical surface r1 are shown below.

| | |
|---|---|
| Radius of curvature: | R = 1.16330 (mm) |
| Conic constant: | k = −1.648500 |
| Aspheric fourth order coefficient A: | $0.869200 \times 10^{-1}$ |
| Aspheric sixth order coefficient B: | $-0.924000 \times 10^{-2}$ |

The other structural parameters are shown below.

| | |
|---|---|
| Lens thickness: | d1 = 1.1500 (mm) |
| Glass: | |
| index of refraction | nd = 1.80610 |
| Abbe's number | vd = 40.9 |
| Transition point | Tg = 574 |
| | (degrees at centigrade) |
| Index of refraction at 1550 nm wavelength: | y = 1.77517 |
| Operating distance between fiber and lens: | Wd = 0.852 (mm) |
| Effective focal distance (1550 nm wavelength): | f = 1.50 (mm) |
| Effective aperture diameter: | D = 1.8 (mm) |
| | (NA = 0.6) |

In the present example x=226.9, y=1.77517, and α=0.77. The material at the point indicated by the reference mark B in FIG. 2 is used in this example. Namely, a material that is close to the lower limit of the infrared distribution indicator x expressing distribution characteristics, however, as is shown in FIG. 6, in this example, aberration is restricted in good range in the 1.2 μm to 1.7 μm wavelength range. Also, the focal point at each wavelength is within 0.015 mm at maximum, showing that the present example exhibits an excellent image forming performance.

In the present example, the sag of which the index of refraction y is comparatively large the sag can be comparatively small. Moreover, a material with a transition point Tg of 574 degrees at centigrade which is quite low compared with, for example, a portion of commercially available lenses, was used. Therefore, the mold ability is excellent. As a result, productivity can be improved.

As has been described above, according to the collimating lens of the present invention, it is possible to form a collimating lens in which there is no deterioration in signal intensity even when the collimating lens is used for communication that uses a broad wavelength band. A collimating lens suitable, for example, for DWDM communication can be achieved. Moreover, this collimating lens gives excellent productivity and makes it possible to reduce manufacturing costs.

Moreover, according to the present invention, a collimating lens having a small amount of chromatic aberration in the 1.2 μm to 1.7 μm wavelength range can be achieved. Furthermore, a collimating lens that does not give rise to a large shift in focal point sufficient to cause degradation in the signal intensity can be manufactured at a cost that is reasonable in consideration of the actual use of the collimating lens. In addition, this collimating lens does not require a high surface precision during manufacturing.

According to the present invention, the majority of the light emitted from a semiconductor laser used as a light source can be condensed using a collimating lens. Accordingly, there is no reduction in signal intensity. Moreover, a collimating lens that only requires simple processing can be achieved.

According to the present invention, because chromatic aberration can be reduced even further a collimating lens providing a still more excellent performance even in broad wavelength bands can be achieved.

According to the present invention, a collimating lens having a small amount of sag can be achieved. Accordingly, the manufacturing process is simplified even further.

According to the present invention, optical loss can be reduced even further. Accordingly, a collimating lens in which signal intensity degradation is reduced even further can be achieved.

What is claimed is:

1. A collimating lens, comprising
a lens having at least one aspherical surface, wherein
the collimating lens is used in a wavelength range of 1.2 $\mu$m to 1.7 $\mu$m and satisfies the following conditions:

$$226 \leq x \leq 456 \text{ and}$$

$$y \leq 1.8, \text{ wherein}$$

where x is an infrared distribution indicator defined by $$x=(n(1.55)-1)/(n(1.45)-n(1.65)),$$

y is an index of refraction at a wavelength of 1.55 $\mu$m shown by
y=n(1.55), and
n(a) is an index of refraction at wavelength of a.

2. The collimating lens according to claim 1, wherein said collimating lens satisfies the following condition:

$$0.6 \leq \alpha \leq 1.1, \text{ wherein}$$

where $\alpha$ is a sagital constant and defined by $$\alpha = NA/(n(1.55)-1), \text{ and}$$

NA is an numerical aperture of said collimating lens.

3. The collimating lens according to claim 1, wherein said collimating lens satisfies the following condition:

$$300 \leq x \leq 456.$$

4. The collimating lens according to claim 1, wherein said collimating lens satisfies the following condition:

$$1.75 \leq y \leq 1.8.$$

5. The collimating lens according to claim 1, wherein said collimating lens has an optical surface that has a reflectance of 1% or less in at least a portion of said wavelength range.

* * * * *